United States Patent
Deng

[11] Patent Number: 5,570,488
[45] Date of Patent: Nov. 5, 1996

[54] VARIABLE PARK AND WIPING RANGE MECHANISM FOR WINDSHIELD WIPER SYSTEM

[75] Inventor: Xiaoming Deng, Ann Arbor, Mich.

[73] Assignee: Ford Motor Company, Dearborn, Mich.

[21] Appl. No.: 489,210

[22] Filed: Jun. 9, 1995

[51] Int. Cl.⁶ ................................. B60S 1/06; B60S 1/34
[52] U.S. Cl. ..................... 15/250.16; 15/250.13; 15/250.30; 15/250.31; 74/411; 74/600
[58] Field of Search .................... 15/250.13, 250.16, 15/250.30, 250.31; 74/411, 600

[56] References Cited

U.S. PATENT DOCUMENTS

| | | |
|---|---|---|
| 3,342,767 | 10/1963 | Simpson . |
| 4,597,129 | 7/1986 | Eustache et al. . |
| 4,878,398 | 11/1989 | Heinrich . |
| 4,924,726 | 5/1990 | Rogakos et al. . |
| 4,947,507 | 8/1990 | Naiki . |
| 5,392,486 | 2/1995 | Hojnacki . |

FOREIGN PATENT DOCUMENTS

| | | |
|---|---|---|
| 0005147 | 2/1979 | European Pat. Off. . |
| 1099876 | 2/1961 | Germany . |
| 3711933A1 | 10/1988 | Germany . |

*Primary Examiner*—David Scherbel
*Assistant Examiner*—Terrence R. Till
*Attorney, Agent, or Firm*—David B. Kelley

[57] ABSTRACT

A vehicle window wiper system has wipers with a range of motion between an in-wipe position I and an out-wipe position O when the wiper system is in a run mode, and a variable park range for the wipers between the in-wipe position I and a depressed park position P when the system is in a park mode. The wiper system has a reversible motor 40 for rotating a shaft 42 in a first direction when in the run mode and through a first predetermined arc in a counter direction when in the park mode. A clutch mechanism 38 mechanically connected with the shaft 42 has interconnected gears 62, 100, 112 and plates 46, 86 for varying the oscillatory wipe range of the wipers 12 between the in-wipe position I and the out-wipe position O in response to an obstruction therebetween, for moving the wipers 12 to a depressed park position P when wiper system is turned off, while permitting the wipers 12 to move to a variable intermediate position S between the in-wipe position I and the depressed park position P when prevented from moving to depressed park position P.

17 Claims, 4 Drawing Sheets

5,570,488

1

VARIABLE PARK AND WIPING RANGE MECHANISM FOR WINDSHIELD WIPER SYSTEM

FIELD OF THE INVENTION

The present invention relates to windshield wiping systems, and, more particularly, to a windshield wiping system having a lost motion mechanism providing a variable wiping range as well as a variable depressed park position.

BACKGROUND OF THE INVENTION

Automotive vehicle designers often desire a windshield wiping mechanism having a wiper which is positioned near or below the window cowl when not in operation, sometimes called a depressed park position. A wiper depressed park position is desirable for aesthetic purposes, as well as for preventing damage to the wipers when exposed to environmental conditions. Mechanisms for moving the wipers to the depressed park position typically do so by forcing a drivepin through which the motor drives the wipers to a radially altered position, as shown in U.S. Pat. No. 4,878,398 (Heinrich). Such mechanisms, however, do not allow for the possibility that snow, ice, slush, accumulated debris, or other obstructions may prevent the wipers from reaching the depressed park position when operation ceases. In such a circumstance, the motor may continue to drive the wipers to the depressed park position potentially resulting in damage to the motor and the wiper linkages.

An integrated depressed park and lost motion mechanism is disclosed and claimed in copending U.S. application Ser. No. 08/417,538, filed on Apr. 6, 1995, assigned to the assignee of the present invention and incorporated by reference herein. One embodiment of that mechanism utilizes a number of interconnected plates and links to alter the radius of rotation of the drivepin thereby increasing the sweep radius of the wiper blades to provide depressed park. Another plate and link provides system protection when the wiper blades are obstructed from moving to the depressed park position. These plates and links, however, increase the number of parts in the mechanism thereby increasing assembly time and complexity while adding weight as well.

Some windshield wiping mechanisms alter the wiping pattern, or range, in response to accumulated snow during windshield wiping operation, as shown in U.S. Pat. No. 5,179,760 (Abe). Such a mechanism does not provide variable depressed park capability but is merely directed to changing the wiper range during normal wiping operation.

As such, the need exists for a windshield wiper mechanism which provides depressed park capability and is responsive to wiper obstructions both in the run and park modes, yet which is lightweight, inexpensive to manufacture, and easy to assemble.

SUMMARY OF THE INVENTION

Responsive to the aforementioned needs in light of the related art, the present invention provides a vehicle window wiper system having a variable wiping range as well as a variable depressed park position. The windshield wiper system has a reversible motor for rotating a shaft to which lost motion means are attached for varying the oscillatory wipe range of at least one windshield wiper, and typically a pair of wipers, between an in-wipe position and an out-wipe position in response to an obstruction therebetween, for example ice or snow build-up. The lost motion means also operates to move the wipers to a depressed park position when the wiper system is turned off, and to permit the wipers to move to an intermediate position between the in-wipe position and the depressed park position when the wipers are prevented from moving to the depressed park position, again for example due to ice or snow build-up. A drivepin connected with the lost motion means attaches to means for transforming the rotary motion of the drivepin to oscillatory motion of the wipers between the out-wipe position and the in-wipe position.

In a preferred embodiment, the lost motion means has a gear crank mounted on the shaft for rotation therewith, a base plate separably connected with the gear crank, and a lost motion plate pivotally connected with the base plate and having the drivepin mounted thereon. A slot in the base plate receives the drivepin therein for allowing radially slidable movement of the drivepin relative to the shaft to enable reduction of the radius of rotation of the drivepin around the shaft in response to transmission of an obstruction induced force to the drivepin. Stop means attached to the base plate stop it at a first predetermined position upon reversal of rotation of the shaft when the wiper system is turned off. Gear means connects the crank gear and the drivepin so as to change the radius of rotation of the drivepin and move the wipers to a depressed park position when the stops the base plate and the gear crank rotates relative thereto. When the drivepin is prevented from changing radius of rotation with the base plate in the first predetermined position, thus inhibiting the wipers from moving to the depressed park position, the lost motion plate pivots with respect to the base plate so as to allow the shaft to rotate to a second predetermined position in which the motor will shut off, and so that the wipers will move to a position intermediate of the in-wipe position and the depressed park position.

Thus, an advantage of the present invention is a windshield wiping system which provides a variable wiping range and a variable depressed park capability.

Another advantage of the present invention is a lost motion mechanism which can be retrofitted onto existing windshield wiping systems to provide additional functionality, including variable wiping and depressed park.

Still another advantage of the present invention is a wiping system which provides low or hidden wiper positioning for cowl styling flexibility.

Yet another advantage of the present invention is a wiper lost motion mechanism which protects the wiper system from damage in the event the wipers are obstructed during wiping operation or during depressed park operation.

Another advantage is a windshield wiping system which is inexpensive to manufacture and easy to assemble.

A feature of the present invention is a slot in the lost motion mechanism base plate for allowing radially slidable movement of a drivepin, and the ball mounted thereon, relative to the shaft when the wiper system is in the run mode to enable reduction of the radius of rotation of the drivepin and the ball around the shaft in response to transmission of an obstruction induced force to the ball so as to vary the range of motion of the wipers between the in-wipe position and the out-wipe position.

Another feature of the present invention is a lost motion mechanism having a gear crank with a baseplate biasedly connected thereto for separation therewith upon reversal of the motor direction for changing the radius of rotation of a drivepin gearedly connected to the gear crank so as to move the wiper blades to a depressed park position.

Yet another feature of the present invention is a pair of plates, including a base plate and a lost motion plate, biased in a first relation by a tension spring, which separate by overcoming the biasing force of the tension spring through application of a force to the drivepin and ball when the wipers are prevented from moving to the depressed park position.

Still another feature of the present invention is a lost motion mechanism having a ball fixed in axial alignment with a gear and eccentrically coupled to the drivepin, the ball journalled with a ball joint on one end of the drive arm so that when the gear is rotated, the ball changes the radius of the joint with respect to the motor shaft thus moving the wipers to a depressed park position.

Yet another feature is a latch carried under a base plate of the lost motion mechanism which interacts with a catch on a base surrounding the motor shaft to stop rotation of the base plate when in a predetermined position after the motor direction is reversed.

BRIEF DESCRIPTION OF THE DRAWINGS

These and other objects, advantages and features of the present invention will be apparent to those skilled in the windshield wiping arts upon reading the following description with reference to the accompanying drawings, in which.

DETAILED DESCRIPTION OF THE PREFERRED EMBODIMENT

Figure 1:
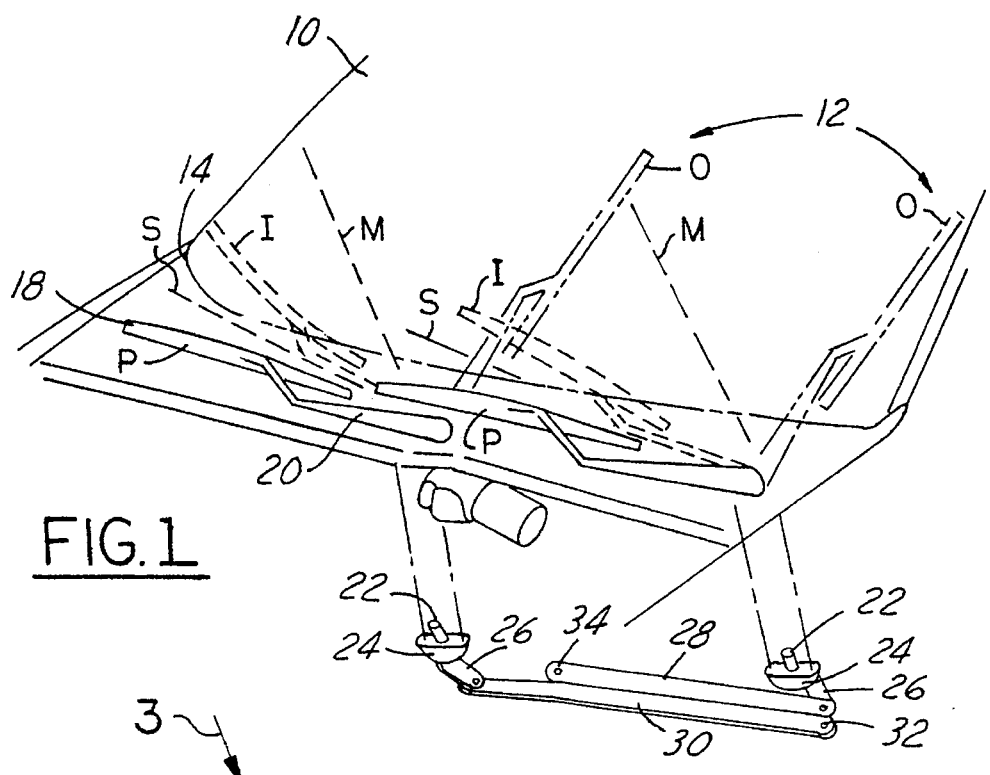
FIG. 1 is a perspective view of an automotive vehicle windshield showing the run and depressed park, as well as the variable run and variable depressed park positions of the wiper blades.

Referring now to the drawings and in particular to FIG. 1 thereof, an automotive windshield 10 has a pair of wipers 12 attached below a cowl portion 14. Wipers 12 are movable between an in-wipe-position I and an out-wipe position O during window 10 wiping operation. During such operation, it is possible that snow, ice, or other debris may collect in the normal wiping range between the in-wipe position I and the out-wipe position O, thereby forming an obstruction to normal wiping operation. In such a circumstance, the wipers 12 move between an intermediate position M and either the in-wipe position I or the out-wipe position O, depending upon the location of the obstruction. As further discussed below, the lost motion mechanism of the present invention provides a variable wiping range between the in-wipe position I and the out-wipe position O without damaging the linkages, motor, or other windshield 10 system accessories, delineated in more detail below.

When not in operation, the wipers 12 are moved to a depressed park position P below the cowl 14. Such a position improves vehicle appearance and styling while providing protection for the wipers 12 from excessive wear due to the elements, such as wind, rain, and ice. When an obstacle prevents the wipers 12 from moving to the depressed park position P, for example, due to snow, ice, or some other debris in the cowl 14 area, the lost motion mechanism of the present invention positions the wipers 12 at a variable depressed park position S between the in-wipe position I and the out-wipe position O (FIG. 1).

Figure 6:
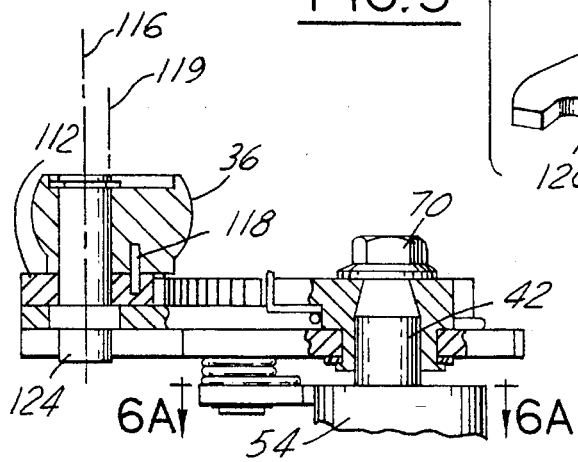
FIG. 6 is a cross-sectional view taken along line 6—6 of FIG. 3.
Figure 13:
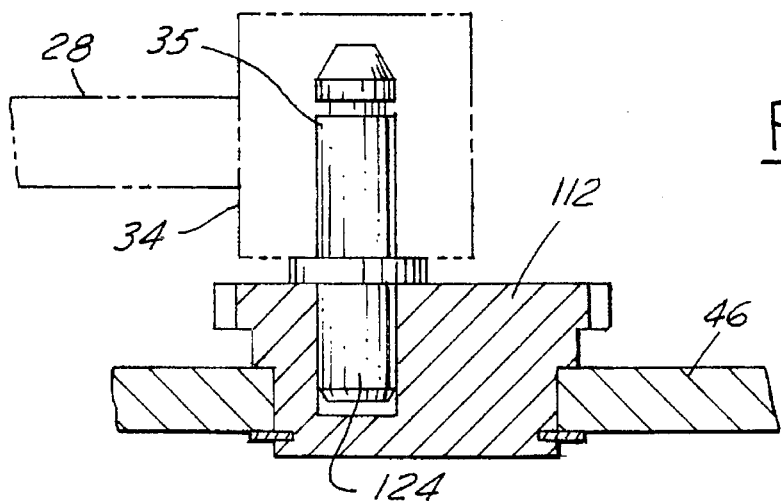
FIG. 13 is a cross-sectional view of a drive-pin for alternatively attaching the lost motion mechanism of the present invention to the wiper drive arm.

Still referring to FIG. 1, each wiper 12 has a wiper blade 18 and a wiper arm 20. The wiper arm 20 is fitted to one end of a wiper shaft 22 and a shaft mount 24. The other end of the shaft 22 is pivotally fitted to a drive link 26 which is pivotally connected to either the drive arm 28 or the slave arm 30. slave arm 30 transmits the oscillatory motion of the drive arm 28 through the link 32 to that drive link 26 not connected to the drive arm 28. The drive arm 28 is pivotally journalled on one end 34 (FIG. 1) to a ball 36 (FIGS. 2–3) which is attached to a lost motion mechanism 38 rotated by a motor 40 (FIG. 2) through a shaft 42 (FIG. 6). Alternatively, the drive arm 28 is connected to a drive pin 35 attached to the lost motion mechanism 38 (FIG. 13).

Figure 2:
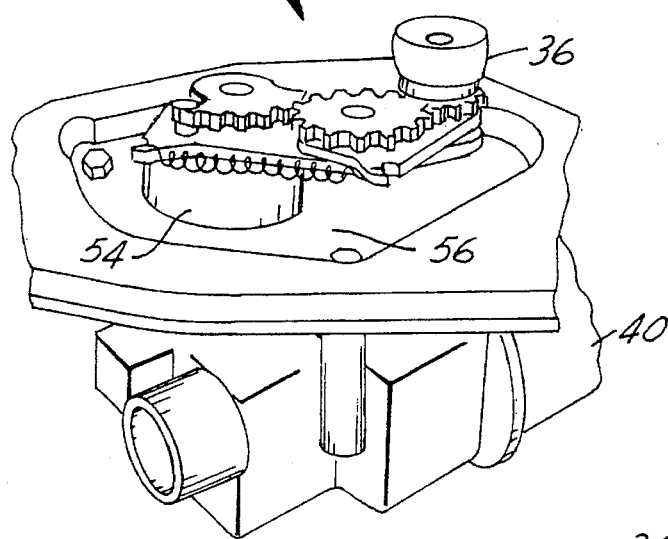
FIG. 2 is a perspective view of a variable run and variable depressed park wiper mechanism according to a preferred embodiment of the present invention.
Figure 3:
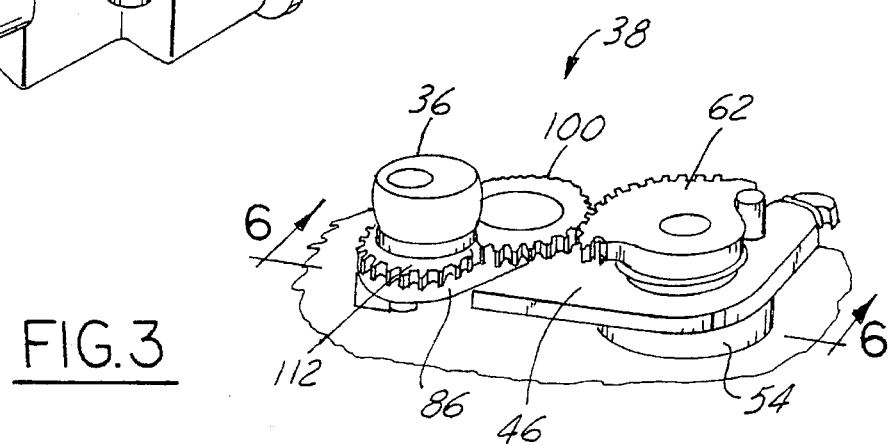
FIG. 3 is a perspective view of the lost motion mechanism in the direction of arrow 3 in FIG. 2.

The motor 40 is a dual direction motor which can rotate the shaft 42 in either a clockwise or counterclockwise direction (FIGS. 2,6). Motor 40 typically rotates the shaft 42 in one direction during wiping operations so that the wipers 12 move between the in-wipe position I and the out-wise position O. When the wiping system is turned off by the vehicle operator, the construction of motor 40 is such that it automatically reverses direction and rotates the shaft 42 through a predetermined arc to a predetermined position. As further explained below, reverse rotation of the shaft 42 and the lost motion mechanism 38 attached thereto results in the wipers 12 achieving the depressed park position P or, alternatively, the variable park position S.

Figure 4:
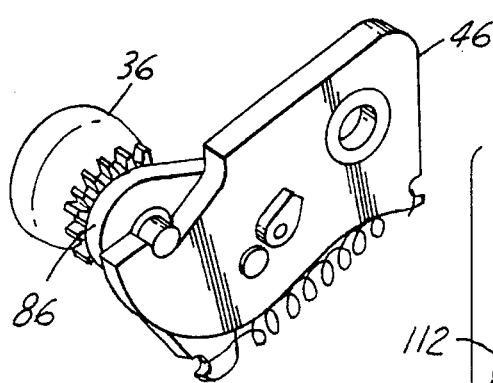
FIG. 4 is a bottom perspective view of the mechanism of FIG. 2.
Figure 5:
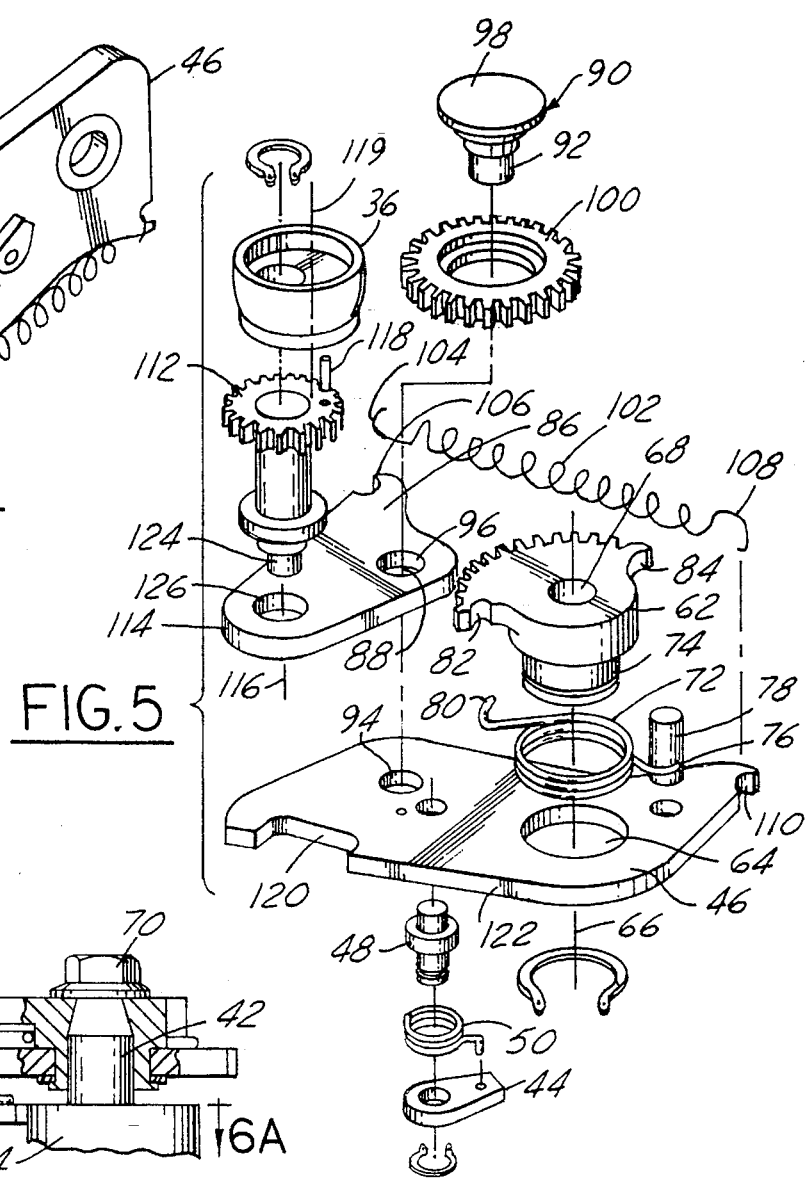
FIG. 5 is an exploded perspective view of the mechanism of FIG. 2.

In FIG. 5, the construction of a preferred embodiment of a lost motion mechanism according to the present invention is shown in exploded view. Beginning near the bottom of FIG. 5, a stop latch 44 is fitted to the bottom of a base plate 46 via a post 48, and a latch spring 50 fits concentrically over the post 48 and attaches at one end to the base plate 46 and at the other end to the latch 44. The latch 44 may thus pivot about the post 48, but is biased by the latch spring 50 radially outward (FIG. 4).

Figure 6A:
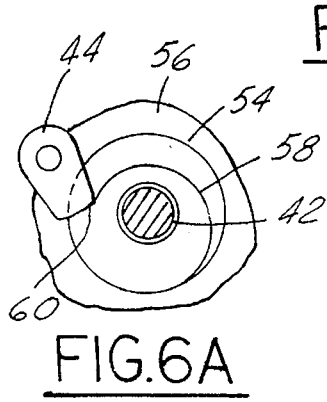
FIG. 6A is a view taken along line 6A—6A of FIG. 6.

As seen in FIG. 6A, a cylindrically shaped base 52, on the casing of the motor, has the shaft 42 projecting therefrom. A cam 54 sits atop a surface 56 of the base 52 and has a radially contoured surface 58 with a land 60 which interacts with the stop latch 44 (FIG. 7) to halt rotation of portions of the lost motion mechanism 38 when the motor 40 direction is reversed, as is further described below.

Figure 7:
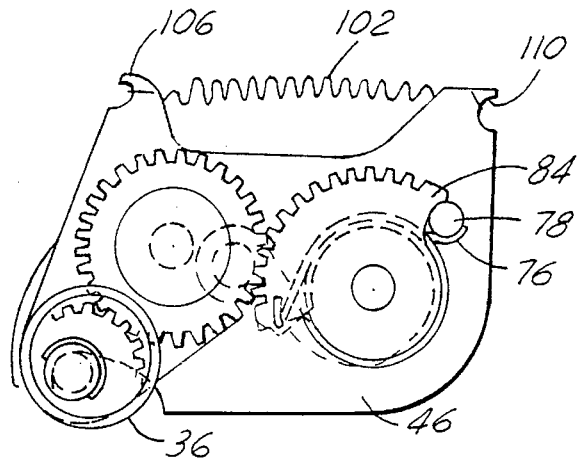
FIG. 7 is a top view of a lost motion mechanism according to the present invention shown in a first predetermined position with the stop latch restraining movement of the lost motion baseplate.

Referring again to FIG. 5, a gear crank 62 is fitted through a bore 64 in the base plate 46 along an axis 66. An aperture 68 in the gear crank 62 receives the shaft 42, which is affixed thereto via a nut 70, for rotation therewith (FIG. 6). The gear crank 62 preferably has a number of teeth 63 along a circumferential portion. A torsional coil spring 72 fits concentrically around a hub portion 74 of the gear crank 62, with one end 76 thereof attached around a on the crank pin 78 fitted to the base plate 46, and the other end 80 to a notch 82 on the gear crank 62. The torsional coil spring 72 thus biases the base plate 46 into a first relation with the gear crank 62, as seen in FIG. 7, where a contoured side 84 of the gear crank 62 mates with the crank pin 78.

In FIG. 6, attachment of the gear crank 62 to the shaft 42 is shown. The shaft 42 preferably has a knurled section 43 for better mating with the gear crank 62. The nut 70 attaches into a threaded portion of the shaft 42 (not shown) through an upper surface of the gear crank 62.

As seen in FIG. 5, a lost motion plate 86 is pivotally mounted at a pivot point 88 with a connector 90 having a cylindrical portion 92 which fits through the bores 94, 96 in the base plate 46 and the lost motion plate 86, respectively. The connector 90 also has a button portion 98 which fits within a second gear 100 mounted at the pivot point 88 in meshing relationship with the gear crank 62.

A tension spring 102 attaches on one end 104 to a hook portion 106 of the lost motion plate 86 and on the other end 108 to a similar hook portion 110 on the base plate 46. The lost motion plate 86 and base plate 46 are thus biased together in a first relation (FIG. 7), but may pivot relative to one another about the pivot point 88 when the force of the tension spring 102 is overcome by a force acting upon the lost motion plate 86, as is further described below. As seen in FIG. 5, a third gear 112 is mounted on an end 114 of the lost motion plate 86 opposite the hook end 106. The third gear 112 is mounted in meshing relationship with the second gear 100, and has the ball 36 mounted thereon for a eccentric movement with respect to the axis 116 of the third gear 112 in response to rotation of the second gear 100. The ball 36 is mounted to the third gear 112 with a pin 118 so that rotation of the third gear 112 causes the ball 36 to rotate through the same arc (FIG. 6). However, since the center axis 119 of the ball 36 is not aligned with the rotational axis 116 of the gear, rotation of the third gear 112, and the ball 36 attached thereto, results in an effective change of radius of rotation of the axis 119 of the ball 36 with respect to the shaft 42 to effect the variable depressed park positions P and S, as further described below.

The base plate 46 has a slot 120, as seen in FIG. 5, along a peripheral edge portion 122 which receives a knob 124 from the third gear 112 which passes through a bore 126 in the end 114 of the lost motion plate 86. The slot 120 allows radial slidable movement of the third gear 112 relative to the shaft 42 when the wiper system is in the run mode to enable reduction of the radius of rotation of the ball 36 around the shaft 42 in response to transmission of an obstruction induced force to the ball 36. The reduction in radius of the ball 36 around the shaft 42 varies the range of motion of the wipers 12 between the in-wipe position I and the out-wipe position O when the wiper system is in the run mode.

It is important that the tension force of the tension spring 102 biasing the lost motion plate 86 to the base plate 46 is substantially larger than the torsional force of the torsion spring which biases the base plate 46 to the gear crank 62 so that the gear crank 62 separates from the base plate 46 at a much lower force than at which the lost motion plate 86 separates from the base plate 46. For example, the tension force of the tension spring 102 may be on the order of 75–100 lb., whereas the torsion force of the torsion coil spring may be on the order of 8–10 in.-lb. Those skilled in the art will recognize that the present invention is not intended to be limited to those spring forces, but can be adjusted appropriately depending on the number of wipers 12, wiper size, motor size, and construction of the various linkages connecting the motor shaft 42 and the wipers 12.

Operation of the mechanism of the present invention is best understood with reference to FIGS. 7–12. Beginning with FIG. 8, it is seen that the mechanism is rotated in a clockwise fashion around a crank gear, along with the base plate 46 and the base plate 46, which are biased thereto as described above, carry the ball 36 through a radius R around the shaft 42. The rotary motion of the ball 36 is translated through the drive arm 28, the slave arm 30, and the drive links 26 to oscillatory motion of the wipers 12 between the in-wipe position I and the out-wipe position O (FIG. 1). This translation of rotary motion into oscillatory motion is shown schematically in FIG. 12.

Figure 8:
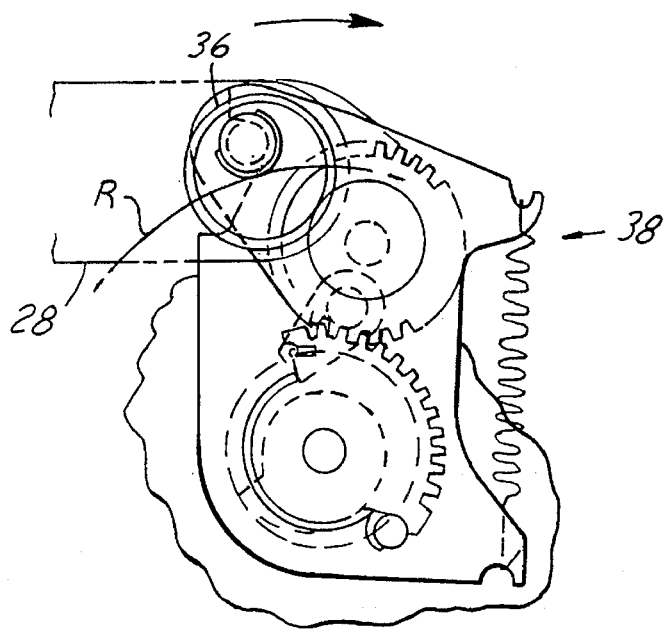
FIG. 8 is a top view similar to FIG. 7 and showing the variable wiper range mechanism of the present invention in the run position.

During rotation of the mechanism, as shown in FIG. 8, the latch carried with the base plate 46 rotates along the cammed surface in a clockwise direction. As the latch passes the land 60, it moves to the contoured surface and continues in a clockwise motion without inhibiting the movement of the mechanism. The latch spring 50 is supple enough to allow the stop latch 44 to rotate around the post 48 when passing the land 60.

Figure 9:
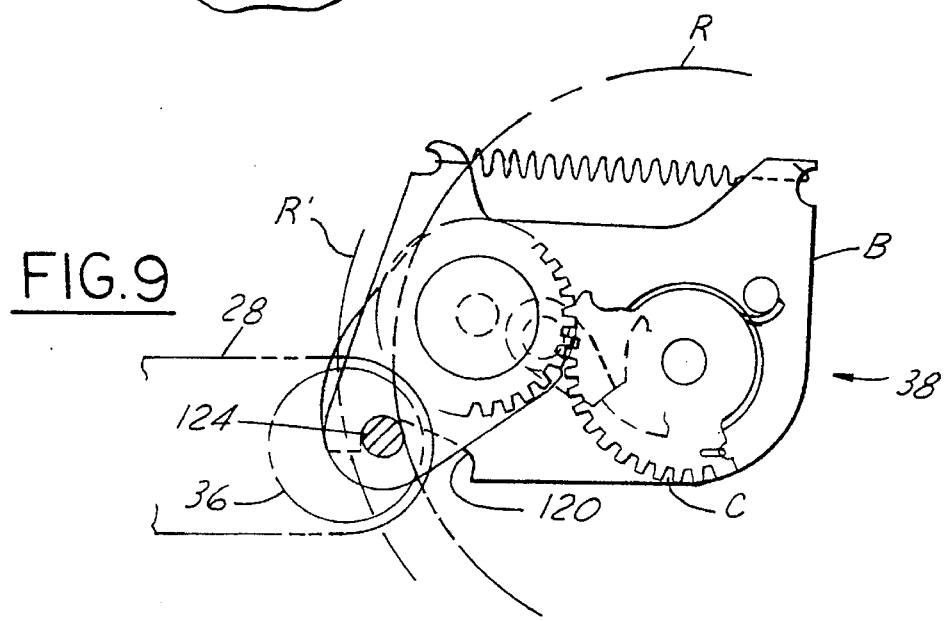
FIG. 9 is a view similar to FIG. 8 but showing the mechanism in the depressed park position.
Figure 10:
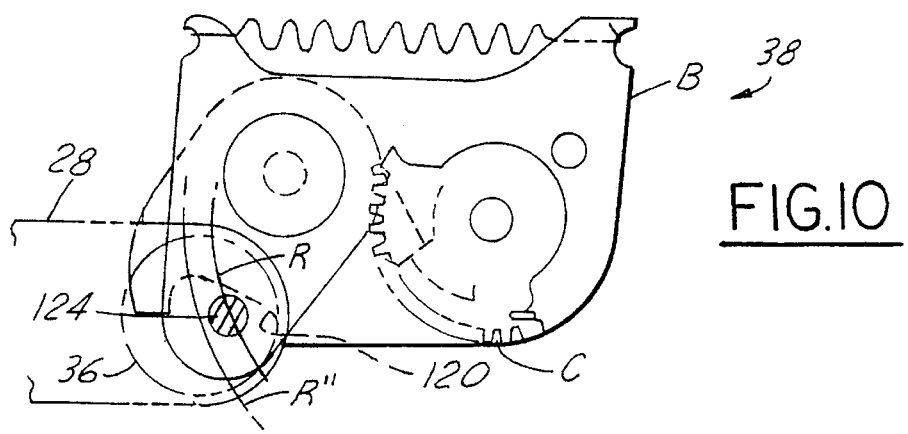
FIG. 10 is a view similar to FIG. 8 but showing the mechanism in a position allowing a variable depressed park position.
Figure 11:
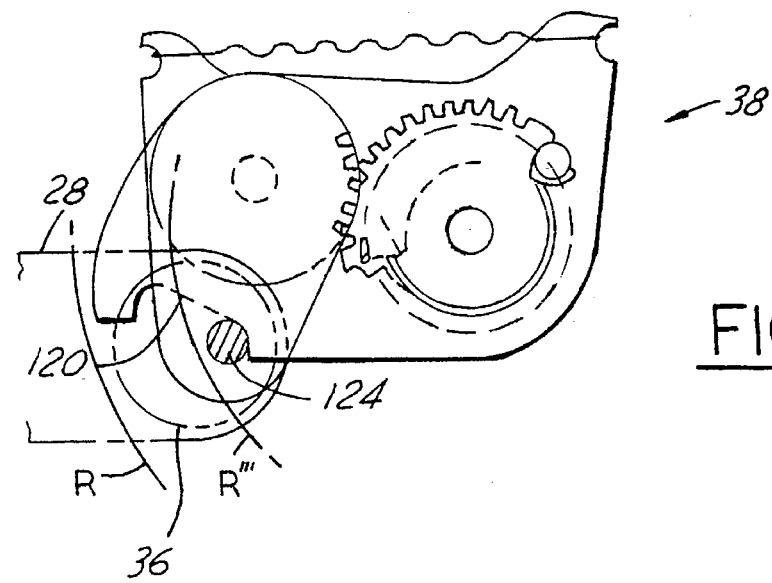
FIG. 11 is a view similar to FIG. 8 but showing the mechanism in a position allowing a variable wiping range in response to a force on the lost motion drivepin and ball.
Figure 12:
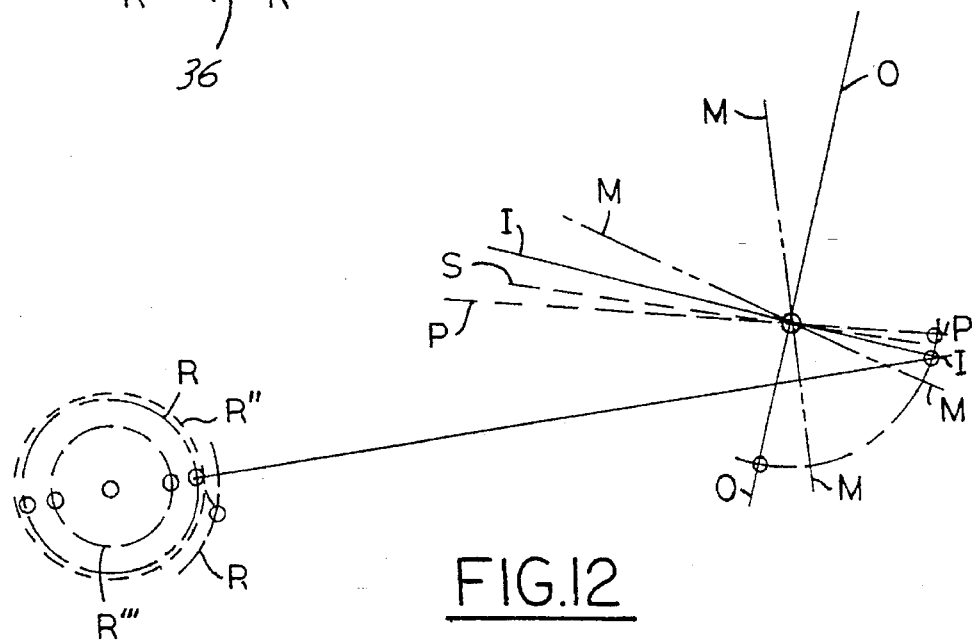
FIG. 12 is a simplified schematic representation of the operation of the lost motion mechanism of the present invention showing the run position, the variable run position and depressed park position.

When wiping operation ceases, as when a vehicle operator turns off the wiping mechanism, the motor reverses direction and rotates the shaft 42, and the gear crank 62 affixed thereto, in a counterclockwise direction to a predetermined position C, as shown in FIGS. 9–10. In doing so, the base plate 46 rotates with the lost motion mechanism 38, and the stop latch 44 carried therebeneath squarely interacts with the land 60 on the contoured surface such that the base plate 46 is restrained from further counterclockwise movement and stops at the position B. The gear crank 62 continues to turn counterclockwise, thus overcoming the biasing force of the torsion coil spring 74 connected to the base plate 46, and stops at the predetermined position C, as shown in FIG. 9. As the gear crank 62 rotates from its normal run mode position (FIG. 8) to the counterclockwise rotated position (FIG. 9), the gear crank teeth 63 interact with the second gear 100 to rotate it through a second predetermined arc. In turn, the second gear 100, which intermeshes with the third gear 112 rotates it and the eccentrically mounted ball 36 thereon through a third predetermined arc to radially increase the distance of ball 36 from the shaft 42 (FIG. 9). An increase in the distance of the ball 36 from the shaft 42 results in a new radius of rotation R' so that the wipers 12 move to the depressed park position P, as schematically shown in FIG. 12.

Under some conditions, the wipers 12 may be prevented from moving from the in-wipe position I to the depressed park position P when wiper operation ceases. The motor 40, nevertheless, will continue to drive the shaft 42 and the gear crank 62 attached thereto to the predetermined motor reversal position C. The lost motion plate 86 provides a means to allow the gear crank 62 to move to the motor reversal position C while permitting the ball 36 to remain at the radius R or at a radius R" between the radius R and the fully depressed park radius R'. Without the lost motion plate 86, the motor 40, the drive arm 28, the slave arm 30, and the links 26 may be damaged. To this end, when a snow pack condition prevents movement of the wipers 12 to the depressed park position P, the ball 36 is prevented from rotating by a force transmitted through the wiper linkages. The two opposing forces, that from the wiper linkages and that from the shaft 42, as translated through the gears (the gear crank 62, the second gear 100 and third gear 112) to the ball 36, is resolved by the force transmitted through the lost motion plate 86 so that it overcomes the bias force of the tension spring 102 and pivots about the pivot point 88. The gear crank 62 can thus rotate through the first predetermined arc so that the motor will shut off when the shaft 42 reaches the position C. The lost motion plate 86 pivots with respect to the base plate 46, and the ball 36 moves, for example, to a slightly increased radius R" from the shaft 42 (FIG. 10).

When in the run mode, that is, when the shaft 42 turns the lost motion mechanism in a clockwise direction similar to FIG. 8, ice, snow, or other debris may result in the wipers 12 being obstructed from moving between the in-wipe position I and the out-wipe position O, as previously discussed. An obstruction induced force is transmitted through the wiper linkages to the ball 36, which then slides the knob 124 within the slot 120 in the base plate 46, along with the third gear 112, radially relative to the shaft 42. Simultaneously, the lost motion plate 86 pivots on the pivot point 88 and moves relative to the base plate 46 while resisting an overcoming the tension force of the tension spring 102 mounted therebetween. The radially slidable movement of the knob 124 in the slot 120 enables reduction of the radius of rotation thereof around the shaft 42 to the radius of rotation R''' (FIG. 11) so as to vary the range of motion of the wipers 12 to an intermediate position M between the in-wipe position I and the out-wipe position O (FIG. 12).

The mechanism just described provides a wiper system to achieve variable wiping range during the normal wiping operation, in addition to a variable depressed park position thereby protecting the wiper motor and wiper system from damage to obstructions encountered in the mode of operation, either park mode or run mode.

Although the preferred embodiments of the present invention have been disclosed, various changes and modifications may be made without departing from the scope of the invention as set forth in the appended claims.

I claim:

1. A windshield wiper system comprising:
    a reversible motor;
    a shaft rotatable by said motor in a run direction and in a counter direction;
    a drivepin connected with said shaft for rotation therearound;
    at least one wiper;
    means connecting said drivepin and said at least one wiper for transforming said rotary motion of said drivepin to oscillatory motion of said at least one wiper between and out-wipe position and an in-wipe position; and
    lost motion means connecting said shaft and said drivepin for
    (a) varying said oscillatory wipe range of said at least one wiper between said in-wipe position and said out-wipe position in response to an obstruction therebetween,
    (b) moving said at least one wiper to a depressed park position upon reversal of rotation of said shaft, and
    (c) permitting said at least one wiper to move to an intermediate position between said in-wipe position and said depressed park position when said at least one wiper is prevented from moving to said depressed park position.

2. A wiper system according to claim 1 wherein said lost motion means comprises:
    a gear crank mounted on said shaft for rotation therewith;
    a base plate separably connected with said gear crank;
    stop means for stopping said base plate at a first predetermined position upon reversal of rotation of said shaft;
    a lost motion plate pivotally connected with said base plate and having said drivepin mounted thereon;
    slot means in said base plate receiving said drivepin therein for allowing radially slidable movement of said drivepin relative to said shaft to enable reduction of said radius of rotation of said drivepin around said shaft in response to transmission of an obstruction induced force to said drivepin; and
    gear means connecting said crank gear and said drivepin so as to change said radius of rotation of said drivepin when said stop means stops said base plate and said gear crank rotates relative thereto;
    said lost motion plate pivoting with respect to said base plate when said drivepin is prevented from changing radius of rotation with said base plate in said first predetermined position so as to allow said shaft to rotate to a second predetermined position.

3. A wiper system according to claim 2 wherein said gear means comprises:
    (a) a first gear rotatably mounted on said lost motion plate in meshing relationship with a set of gear teeth on said gear crank; and
    (b) a second gear rotatably mounted on said lost motion plate in meshing relationship with said first gear, said drivepin affixed to said second gear at a distance from said axis of rotation for rotation therearound.

4. A wiper system according to claim 3 wherein said means connecting said drivepin and said at least one wiper comprises a drive arm attached to said drivepin on one end thereof and to a drive link on said other end thereof, said drive link attached to a wiper shaft for rotation therearound, said wiper shaft having said at least one wiper mounted thereto for oscillatory motion therearound.

5. A wiper system according to claim 4 wherein a ball is fixed in axial alignment with said second gear and is eccentrically coupled to said drivepin, said ball journalled with a ball joint on one end of said drive arm.

6. A wiper system according to claim 2 wherein said stop means comprises a latch carried with said base plate for engaging a catch fixed relative thereto.

7. A wiper system according to claim 2 wherein said lost motion plate is biasedly connected to said base plate with a tension coil spring.

8. A wiper system according to claim 7 wherein said base plate is biasedly connected to said gear crank with a torsional coil spring.

9. A wiper system according to claim 8 wherein the tension force of said tension spring biasing said lost motion plate to said base plate is substantially larger than the torsional force of said torsional spring biasing said base plate to said gear crank.

10. A wiper system for a vehicle window, the system comprising:
    (1) a dual direction motor having a shaft rotatable thereby in a run direction and in a counter direction;

(2) a drivepin in mechanical connection with the shaft defining a radius of rotation therearound;

(3) means for transforming the rotary motion of the drivepin to oscillatory motion of at least one window wiper; and (4) a lost motion mechanism mounted to the shaft and having the drivepin connected thereto, the lost motion mechanism comprising:

(a) wipe pattern varying means for reducing the oscillatory wipe pattern of the at least one wiper in response to an obstruction between the in-wipe position and the out-wipe position;

(b) depressed park means for moving the at least one wiper to a depressed park position upon reversal of rotation of said shaft; and (c) adjustable park means for permitting the at least one wiper to move to an intermediate position between the in-wipe position and the depressed park position when the at least one wiper is prevented from moving to the depressed park position.

11. A wiper system according to claim 10 wherein the wipe pattern varying means comprises slot means in the lost motion mechanism for receiving the drivepin therein to allow radially slidable movement relative to the shaft to enable reduction of the radius of rotation of the drivepin around the shaft in response to transmission of an obstruction induced force to the drivepin.

12. A wiper system according to claim 10 wherein the depressed park means comprises gear means for increasing the radius of rotation of the drivepin around the shaft when the shaft reaches a first predetermined position upon reversal of motor direction so as to move the at least one wiper to the depressed park position.

13. A wiper system according to claim 10 wherein the adjustable park means comprises means for allowing the shaft to rotate to a second predetermined position upon reversal of motor direction when the drivepin is prevented from changing radius of rotation with the shaft in the first predetermined position so as to allow the motor to shut off when the shaft reaches the second predetermined position.

14. A vehicle window wiper system having a run mode and a park mode, the wiper system comprising:

(1) at least one window wiper having a range of motion between an in-wipe position and an out-wipe position when the wiper system is in the run mode, and having a variable park range between the in-wipe position and a depressed park position when the system is in the park mode;

(2) a motor for rotating a shaft in a first direction when in the run mode and through a first predetermined arc in a counter direction when in the park mode;

(3) a lost motion mechanism mechanically connected with the shaft for rotary motion therearound, the lost motion means comprising:

(a) a first gear mounted on the shaft for rotation therewith;

(b) a base plate separably connected to the first gear with a torsion spring;

(c) stop means for stopping the base plate at a first predetermined position when the wiper system is in the park mode;

(d) a lost motion plate pivotally mounted at a pivot point on the base plate and having a tension spring biasing the base plate thereto in a first relation;

(e) a second gear mounted at the pivot point in meshing relationship with the first gear;

(f) a third gear mounted on an end of the lost motion plate in meshing relationship with the second gear;

(g) a ball mounted to the third gear for eccentric movement with respect to the axis thereof in response to rotation of the second gear, the ball having a radius of rotation around the shaft when the wiper system is in the run mode;

(h) a slot in the base plate for allowing radially slidable movement of the third gear relative to the shaft when the wiper system is in the run mode to enable reduction of the radius of rotation of the ball around the shaft in response to transmission of an obstruction induced force to the ball so as to vary the range of motion of the at least one wiper between the in-wipe position and the out-wipe position when the wiper system is in the run mode;

(i) the first gear overcoming the connecting bias force of the torsion spring and separating from the base plate when in the park mode while rotating through the first predetermined arc in the counter direction, thus rotating the second gear through a second predetermined arc, the second gear rotating the third gear and the eccentrically mounted ball thereon through a third predetermined arc to radially increase the distance of the ball from the shaft thereby positioning the at least one wiper in the depressed park position;

(j) the lost motion plate overcoming the bias force of the tension spring to pivot about the pivot point when the ball is prevented from rotation due to an obstacle between the in-wipe position and the depressed park position so as to allow the first gear to rotate through the first predetermined arc;

(4) a driver arm journalled to the ball; and (5) means for transforming the motion of the driver arm to oscillatory motion of the least one window wiper between the in-wipe position and the out-wipe position.

15. A wiper system according to claim 14 wherein the stop means comprises a latch carried with the base plate for engaging a catch fixed relative thereto when the wiper system is in the park mode.

16. A wiper system according to claim 14 wherein the tension force of the tension spring biasing the lost motion plate to the base plate is substantially larger than the torsional force of the torsional spring biasing the base plate to the gear crank.

17. A wiper system according to claim 14 wherein the means for transforming comprises a drive link attached on one end of the driver arm and on the other end to a wiper shaft for rotation therearound, the wiper shaft having the at least one wiper mounted thereto for oscillatory motion therearound.

* * * * *